(12) United States Patent
Earl et al.

(10) Patent No.: US 7,107,381 B2
(45) Date of Patent: Sep. 12, 2006

(54) FLEXIBLE DATA TRANSFER TO AND FROM EXTERNAL DEVICE OF SYSTEM-ON-CHIP

(75) Inventors: Jeffrey S. Earl, San Jose, CA (US); George Apostol, Jr., Santa Clara, CA (US); Douglas A. Cross, Boulder Creek, CA (US)

(73) Assignee: PMC-Sierra, Inc., Santa Clara, CA (US)

( * ) Notice: Subject to any disclaimer, the term of this patent is extended or adjusted under 35 U.S.C. 154(b) by 847 days.

(21) Appl. No.: 10/301,369

(22) Filed: Nov. 20, 2002

(65) Prior Publication Data

US 2004/0098530 A1 May 20, 2004

(51) Int. Cl.
G06F 13/14 (2006.01)
G06F 13/36 (2006.01)
G06F 13/38 (2006.01)

(52) U.S. Cl. .................. 710/305; 710/65; 710/315

(58) Field of Classification Search ............ 710/315, 710/65, 305; 395/436; 711/201; 712/204
See application file for complete search history.

(56) References Cited

U.S. PATENT DOCUMENTS

| | | | |
|---|---|---|---|
| 5,555,433 A | 9/1996 | Nguyen et al. | |
| 6,247,084 B1 | 6/2001 | Apostol, Jr. et al. | |
| 6,694,392 B1 * | 2/2004 | Haren | 710/65 |
| 6,886,057 B1 * | 4/2005 | Brewer et al. | 710/63 |
| 2002/0159474 A1 * | 10/2002 | Apostol et al. | 370/463 |
| 2002/0161959 A1 * | 10/2002 | Apostol et al. | 710/305 |
| 2002/0161978 A1 * | 10/2002 | Apostol et al. | 711/151 |
| 2003/0042506 A1 * | 3/2003 | Kellgren et al. | 257/200 |

* cited by examiner

Primary Examiner—Rehana Perveen
Assistant Examiner—Jeremy S. Cerullo
(74) Attorney, Agent, or Firm—Schwabe, Williamson & Wyatt, P.C.

(57) ABSTRACT

In a bus interface unit, a first communications interface is provided for the coupling of a first plurality of peripheral devices of different device types to facilitate communication with a selected one of the first plurality of peripheral devices of different device types. In addition, a second communications interface is provided for coupling to a first bus of an integrated circuit (IC) to facilitate communication with a selected one of a second plurality of devices of the IC, via the first bus. A controller is provided for the coupling of the first and second communications interfaces to facilitate communications between selected ones of the first and second plurality of devices, dynamically selecting and employing a communication protocol consistent with the device type of the selected one of the first plurality of peripheral devices. The bus interface unit has particular application to interfacing external devices with the core of an SOC.

21 Claims, 11 Drawing Sheets

| Parameter | Description | Minimum Cycles | Maximum Cycles |
|---|---|---|---|
| $T_{dsas}$ | Number cycles from data strobe to address strobe | 0 | 1 |
| $PW_{as}$ | Number cycles of width of Address Strobe | 1/2 | 1 1/2 |
| $T_{asds}$ | Number cycles from address strobe inactive to data strobe | 0 | 2 |
| $PW_{ds}$ | Number cycles of width of Data Strobe | 1 | 9 |
| $T_{dscs}$ | Number cycles from data strobe inactive to chip select inactive | 0 | 1 |

Figure 7 Motorola Bus Write Timing (Muxed)

Figure 8 Motorola Bus Read Timing (Muxed)

Figure 9 Intel Bus Write Timing (Muxed)

Figure 10 Intel Bus Read Timing (Muxed)

FLEXIBLE DATA TRANSFER TO AND FROM EXTERNAL DEVICE OF SYSTEM-ON-CHIP

BACKGROUND OF THE INVENTION

1. Field of the Invention

The present invention relates to the field of integrated circuits. More specifically, the present invention relates to data transfer between an SOC core and devices external to that core.

2. Background Information

Advances in integrated circuit technology have led to the birth and proliferation of a wide variety of integrated circuits, including but not limited to application specific integrated circuits, micro-controllers, digital signal processors, general purpose microprocessors, and network processors. Recent advances have also led to the birth of what's known as "system on a chip" or SOC. Typically, an SOC includes multiple "tightly coupled" subsystems performing very different functions.

These SOC designs frequently include a "core design" ("core") to which adopters will add additional features as necessary. Examples of the additional features include "external" memory devices such as flash memory, communications interface devices such as Ethernet controllers and other "intellectual property" or IP components. When this occurs, any number of the subsystems of "core" may have a need to communicate with devices that are "external" to the "core".

Frequently these "external" devices have been designed to interface to a popular processing device or a standard bus interface. Such devices including processors from Intel® Corporation and processors from Motorola® Corporation. Such bus interfaces include PCI, PCMCIA, and CardBus. To maximize the flexibility to the designers of the system containing the SOC design, the ability of the SOC design to flexibly and/or efficiently support multiple types of "external" devices is desirable.

Accordingly, a more flexible and/or efficient mode of communicating with devices which are not part of the core integrated circuit design is desired.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE PREFERRED EMBODIMENTS

The present invention includes interface units and operational methods for flexibly facilitating communication between external devices to an SOC design and internal devices that are part of a tightly integrated core system. In the following description, various features and arrangements will be described to provide a thorough understanding of the present invention. However, the present invention may be practiced without some of the specific details or with alternate features/arrangements. In other instances, well-known features are omitted or simplified in order not to obscure the present invention.

The description to follow repeatedly uses the phrase "in one embodiment", which ordinarily does not refer to the same embodiment, although it may. The terms "comprising", "having", "including" and the like, as used in the present application, including in the claims, are synonymous. The term "external" as used in the description to follow and in the claims, refers to devices physically external to the integrated circuit (IC) containing the external bus interface, as well as to devices attached to the external bus interface that are co-disposed with the "core" on the IC.

Overview

Figure 1:
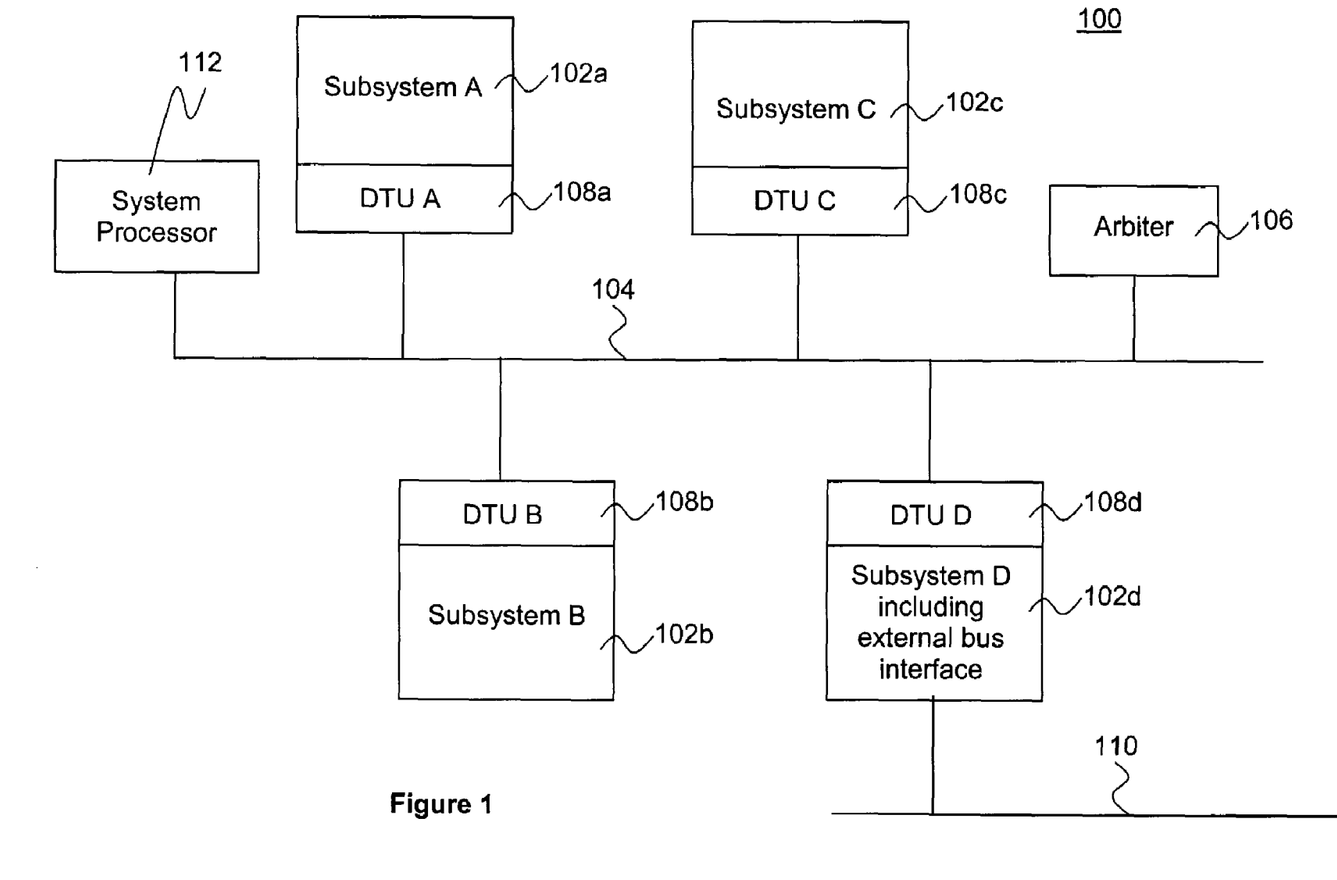
FIG. 1 illustrates a block diagram of an overview of an SOC with subsystems incorporated with the teachings of the present invention for interfacing with external devices, in accordance with one embodiment.

Referring now to FIG. 1, wherein a block diagram illustrating an overview of an SOC core 100 with subsystems 102a–102d incorporated with the teachings of the present invention for interfacing with external devices, in accordance with one embodiment, is shown. As illustrated, for the embodiment, SOC 100 includes SOC bus 104 and subsystems 102a–102d coupled to each other through SOC bus 104. Moreover, each of subsystems 102a–102d includes data transfer unit or interface (DTU) 108a–108d, correspondingly coupling the subsystems 102a–102d to SOC bus 104. SOC 100 also includes arbiter 106 and system processor 112 which are also coupled to core bus 104. Subsystem 102d further includes an interface to an external bus 110, in accordance with the present invention.

SOC core 100 is intended to represent a broad range of SOC, including multi-service ASICs. In particular, in various embodiments, subsystems 102a–102d may be one or more of a memory controller, a security engine, a voice processor, a collection of peripheral device controllers, a framer processor, and a network media access controller.

Moreover, by virtue of the advantageous employment of DTU 108a–108d to interface subsystems 102a–102d to SOC bus 104, with DTU 108a–108d and SOC bus operating on the same clock speed, the core logic of subsystems 102a–102d may operate in different clock speeds, including clock speeds that are different from the clock speed of SOC bus 104 and DTU 108a–108d. In one embodiment, one or more subsystems 102a–102d may be a multi-function subsystems, in particular, with the functions identified by identifiers. Except for the teachings of the present invention incorporated into subsystems 102a–102d, the exact constitution and the exact manner that their core logic operate in providing the functions/services to the subsystems are immaterial to the present invention. While for ease of understanding, SOC core 100 is illustrated as having only four subsystems 102a–102d, in practice, SOC core 100 may have more or less subsystems. In particular, by virtue of the advantageous employment of DTU 108a–108d to interface subsystems 102a–102d to SOC bus 104, zero or more selected ones of subsystems 102a–102d may be removed, while other subsystems 102a–102d may be flexibly added to SOC core 100. Similarly, arbiter 106 may be any one of a number of bus arbiters known in the art. The facilities of DTU 108a–108d and the teachings incorporated into the core logic of subsystems 102a–102d to practice the present invention will be described in turn below.

External Bus Interface Subsystem

Figure 2:
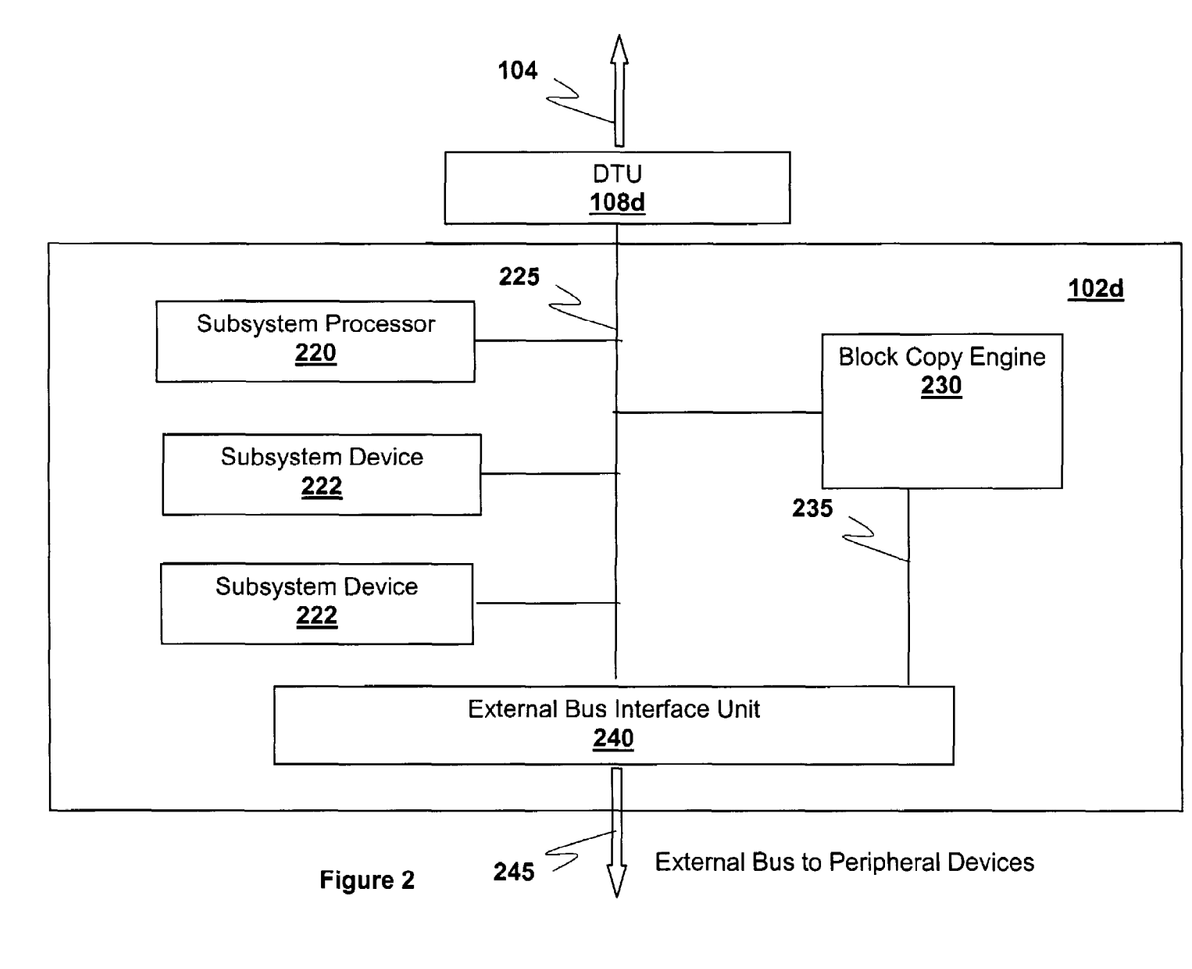
FIG. 2 illustrates a block diagram of a subsystem for interfacing with external devices, in accordance with one embodiment.

Refer now to FIG. 2 which illustrates a block diagram of a subsystem for interfacing with external devices, in accordance with one embodiment. DTU 108d for subsystem 102d provides an interface to the SOC bus 104, a system processor 112 and other subsystems 102a–102c of the SOC core 100. In this embodiment, subsystem 102d contains a subsystem processor 220, block copy engine 230, other subsystem devices 222, a subsystem bus 225 and external bus interface unit 240 for communicating with peripheral devices (not shown) through an external bus 245. Thus, external bus interface unit 240 facilitates communication between the peripheral devices and other functional blocks in the design. These functional blocks may be in the subsystem 102d containing the external bus interface unit. Alternatively, these functional blocks may be in other parts of the SOC designs such as subsystems 102a–102c.

Figure 3:
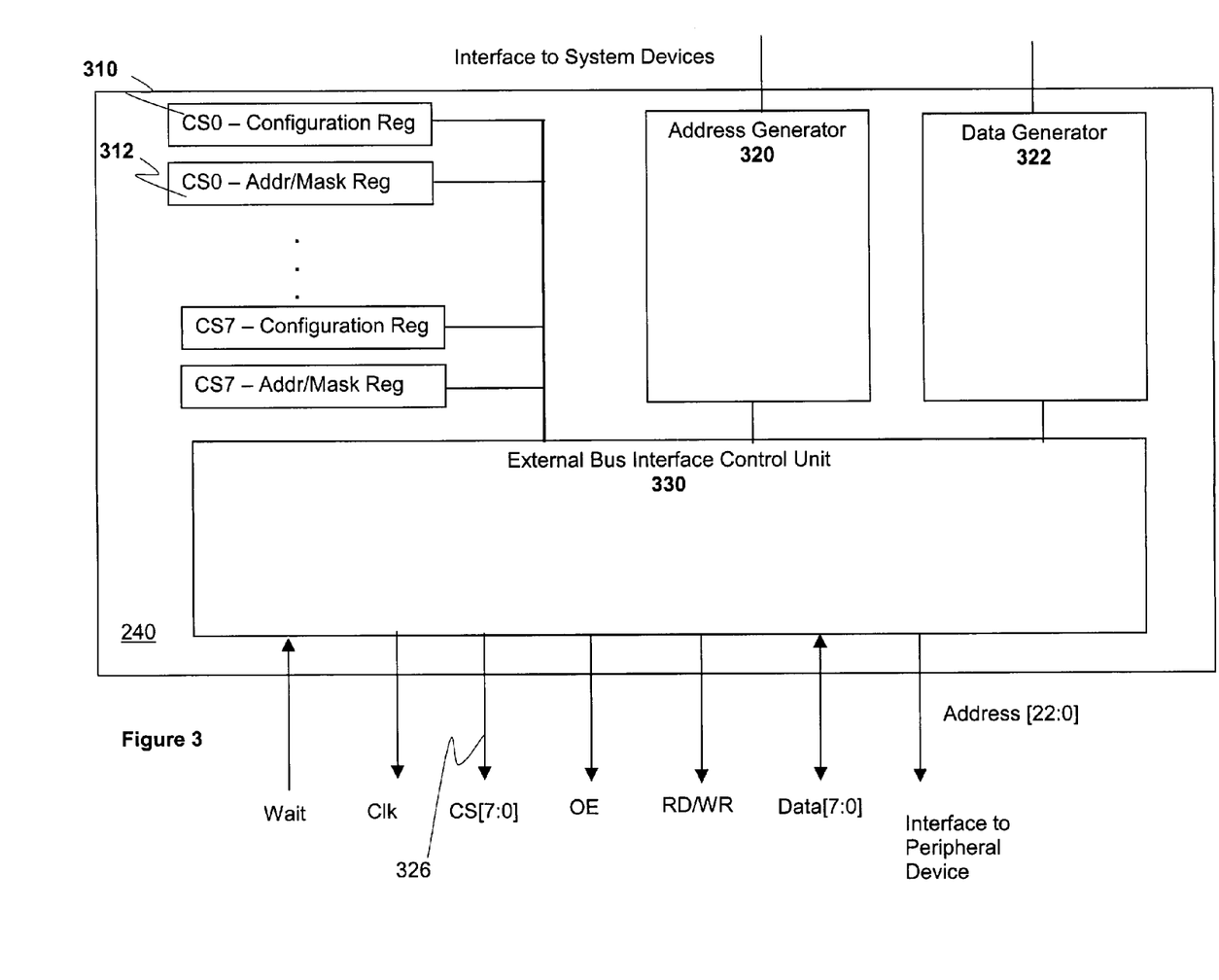
FIG. 3 illustrates a block diagram of an external bus interface unit, in accordance with one embodiment.

FIG. 3 illustrates a block diagram of an external bus interface unit, in accordance with one embodiment. In this exemplary embodiment, the external bus interface unit 240 contains a bus interface control unit 330, configuration registers 310–312, address generator 320 and data generator 322. Based on the configuration settings for address and data muxing types as well as bus size, the address generator 320 will create byte or half-word aligned external addresses. In addition, the data generator 322 will align data based on bus size and data muxing type. In this embodiment, chip select signals 326 are used to indicate which peripheral device, of a number of peripheral devices, is being addressed by the external bus interface unit 240 at a particular time. Bus interface control unit 330 and configuration registers 310 312 are used to dynamically select and employ a communications protocol on external bus 245. This communications protocol is determined by the device being addressed as indicated by the asserted chip select signal. The present invention, by being able to dynamically select and employ communications protocols, advantageously allows multiple peripheral devices with different protocols to be used concurrently on a single external bus.

Figure 4:
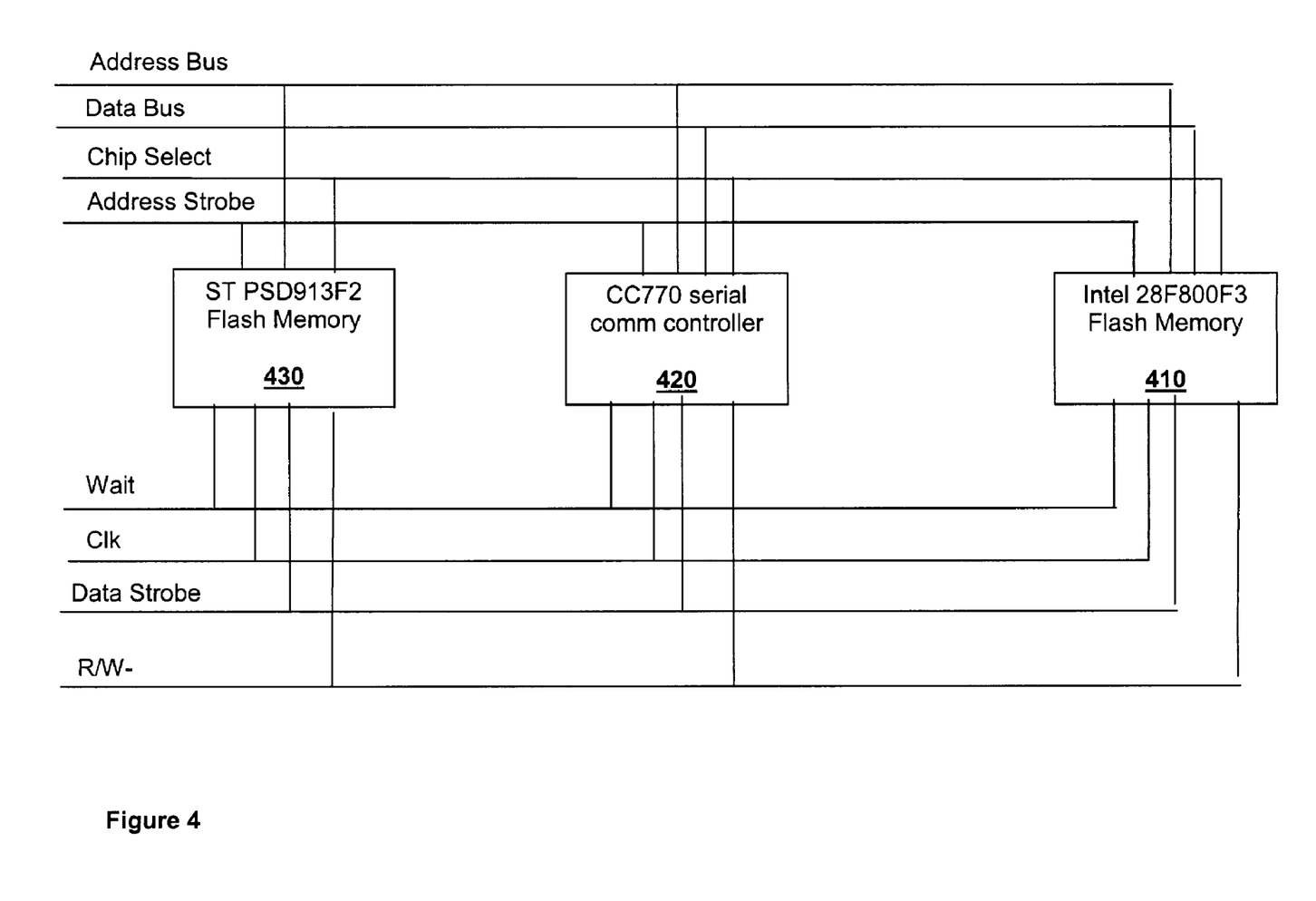
FIG. 4 illustrates a block diagram of an external bus with diverse peripheral devices, in accordance with one embodiment.

FIG. 4 illustrates a block diagram of an external bus with diverse peripheral devices, in accordance with one embodiment. In this embodiment, three devices, each with different bus interface requirements are shown. Serial communications controller 420 is configured to communicate in 8-bit non-multiplexed Motorola® mode. Flash memory device 410 is an Intel® 28F800F3 device operating in a 16-bit non-multiplexed mode. Flash memory device 430 is compatible with an Intel® 8-bit multiplexed mode. The present invention advantageously provides the ability to dynamically select and employ a communications protocol to facilitate access to this exemplary set of peripheral devices.

Figure 5A:
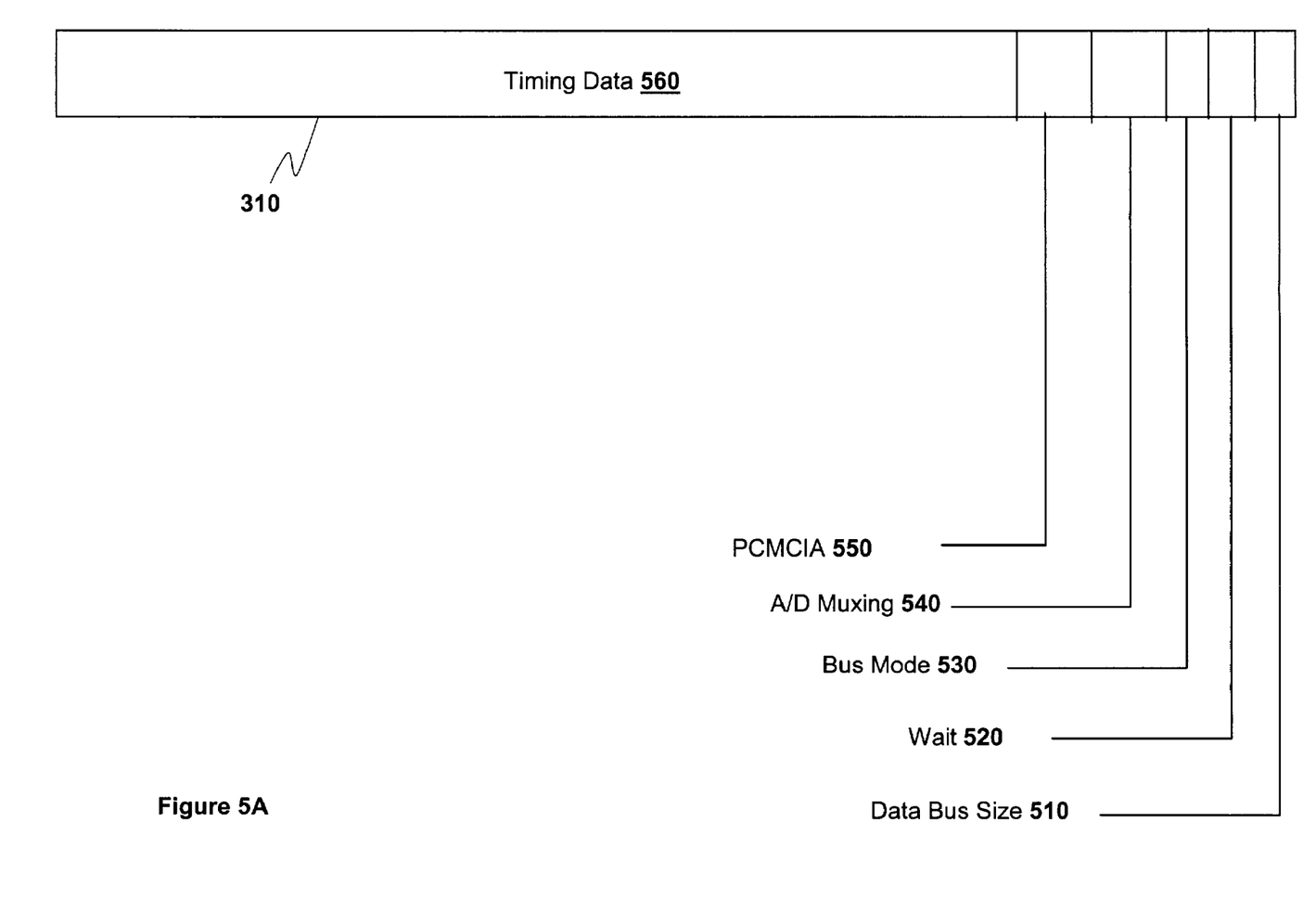
FIG. 5A illustrates a sample configuration register for a peripheral device, in accordance with one embodiment.
Figure 5B:
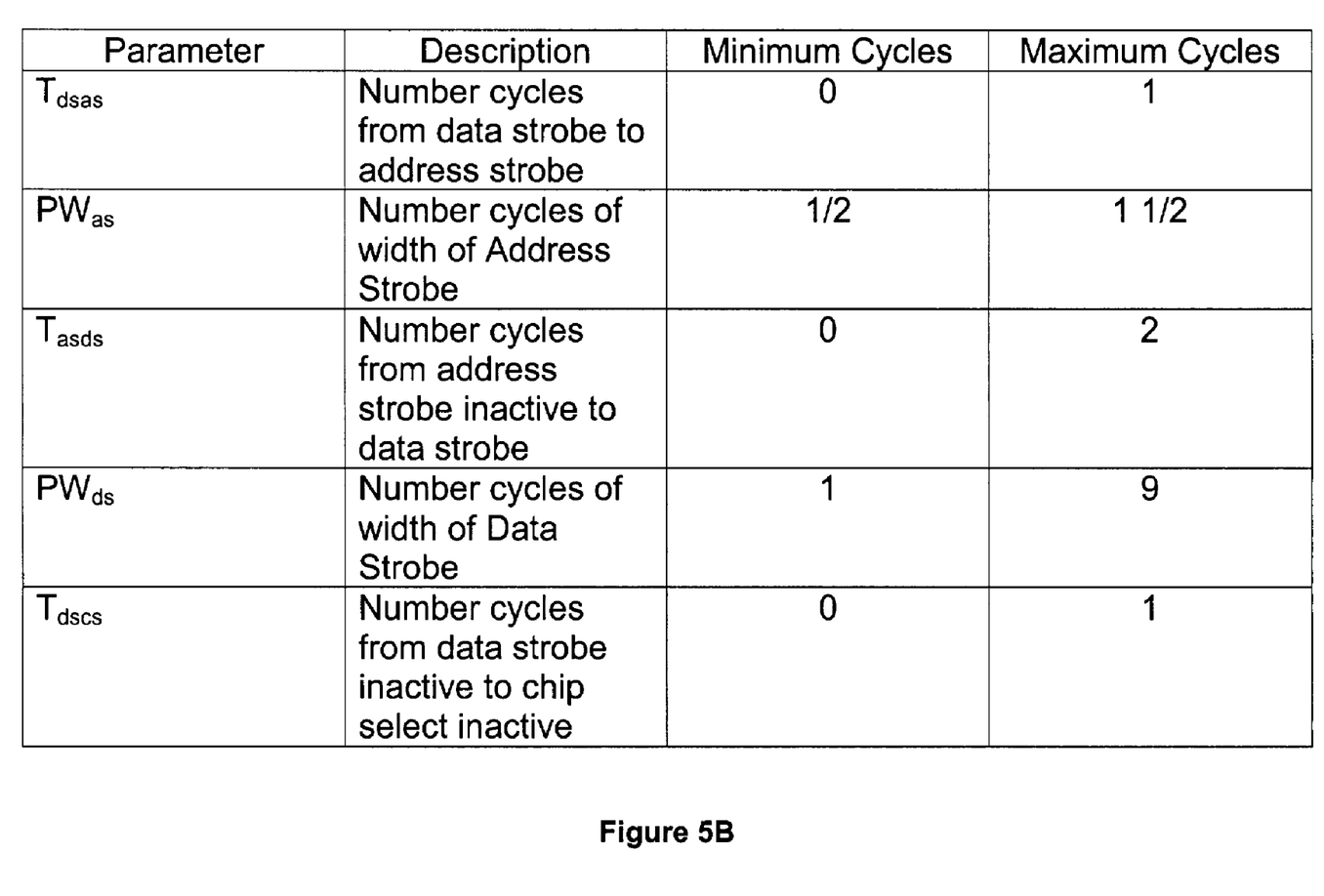
FIG. 5B shows a table containing timing information for muxed Motorola® bus timing adjustments, in accordance with one embodiment.

FIG. 5A illustrates a sample configuration register corresponding to a peripheral device, in accordance with one embodiment. The configuration register 310 contains information regarding how communications with the corresponding peripheral device are accomplished over the external bus. The configuration register contents are utilized by the external bus interface control unit 330 to determine the proper communications protocol with the corresponding peripheral device. In this embodiment, the data bus size 510 bit indicates whether the device associated with the configuration register has a 8-bit or 16-bit data bus. Wait bit 520 indicates whether the protocol for the selected peripheral supports wait signaling. In this embodiment, a bus mode 530 bit is used to indicate the bus mode, Intel® or Motorola®, to be used to address the selected peripheral device. Two bits are used to indicate the type of address and data muxing to be used when communicating with the selected peripheral 540. In one configuration, the configuration register contains information indicating that no address/data muxing will occur. In another configuration, the configuration information indicates that the high order data bits are supplied to the low order address bit and the low order data bits are supplied to the data bits. In the embodiment shown, the configuration register contains a PCMCIA bit 550. PCMCIA bit 550 indicates whether PCMCIA compatible signaling is to be used to address the selected peripheral device. The configuration register also contains information on timing data 560 for the interface. FIG. 5B shows a table containing timing information for muxed Motorola® bus timing adjustments, in accordance with one embodiment. These bus timing adjustments are discussed below in connection with the external bus interface control unit state machine.

Thus, configuration information contained in the configuration registers 310 312 is used to identify, for the external bus interface control unit, a communications personality for the device associated with the configuration registers. For example, in one embodiment, the chip select 326 lines are used to each select a single external device based on the address configured for the particular chip select. The configuration information for the determined chip select is read from the chip select line's configuration registers. Based on the information contained in the configuration registers, a proper protocol for communicating with the device addressed by the chip select is used to communicate with that device.

Figure 6:
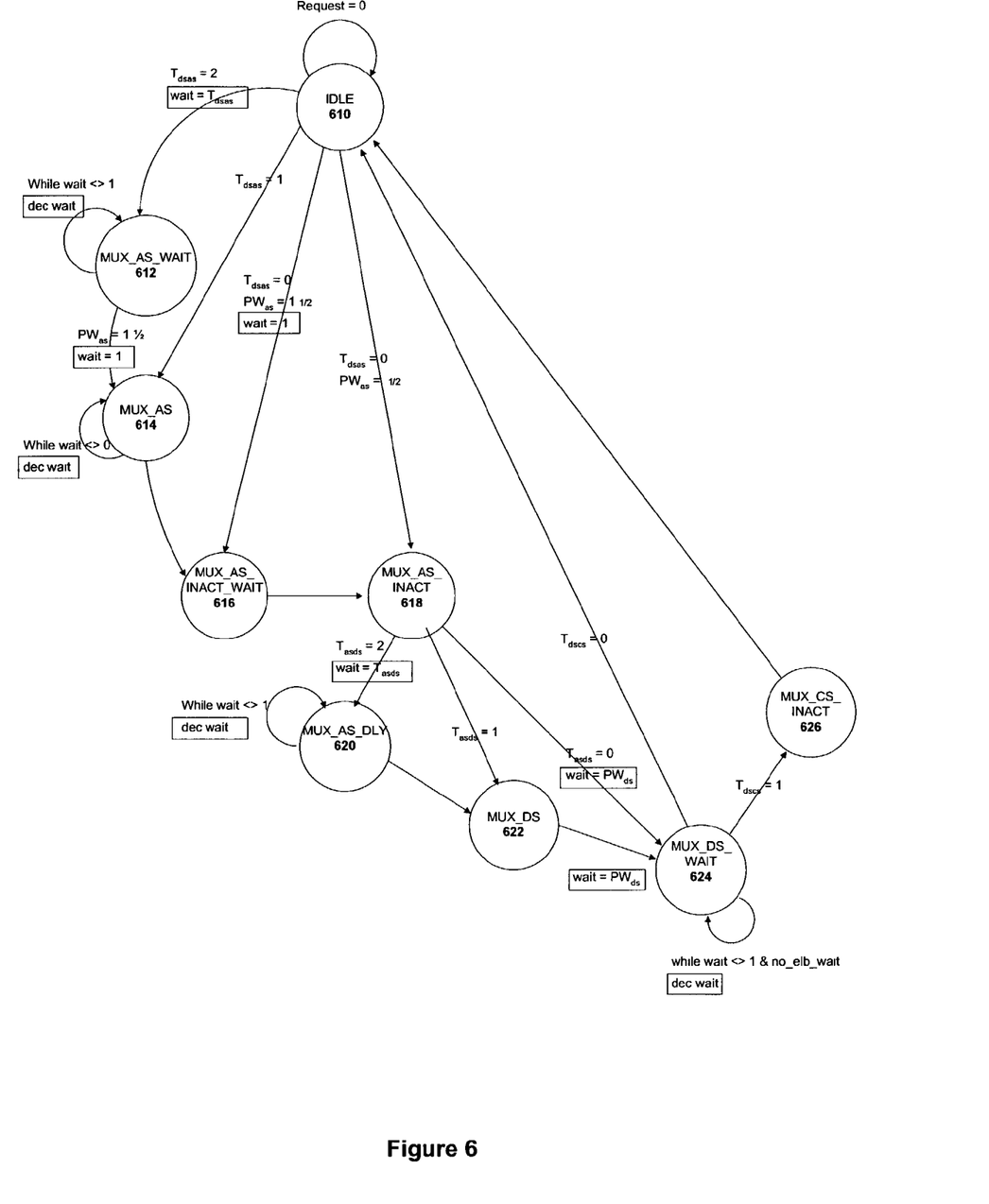
FIG. 6 illustrates a portion of a state machine controlling muxed operations to peripheral devices, in accordance with one embodiment.

FIG. 6 illustrates a portion of a state machine controlling muxed operations to peripheral devices, in accordance with one embodiment. If no access request has been received by the state machine controller (Request=0), the state machine remains in its idle state 610. When an access request (Request=1) is received for a selected device, the configuration registers associated with the chip select lines for the selected device are checked to determine information about the signaling for the selected device. One configuration register entry provides information on whether there is address/data muxing 540. If there is address/data muxing, then the portion of the state machine shown in FIG. 6 is executed. Other configuration registers are checked to determine the proper parameters for the devices being addressed as previously discussed in relation to FIG. 5.

Figure 7:
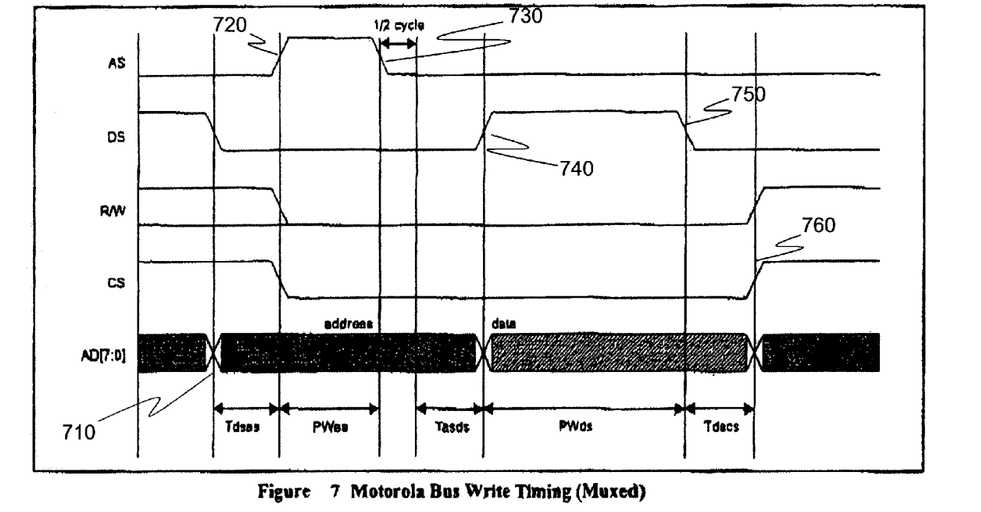
FIG. 7 illustrates a timing diagram for writing to a peripheral device communicating using a muxed Motorola® peripheral bus format.
Figure 8:
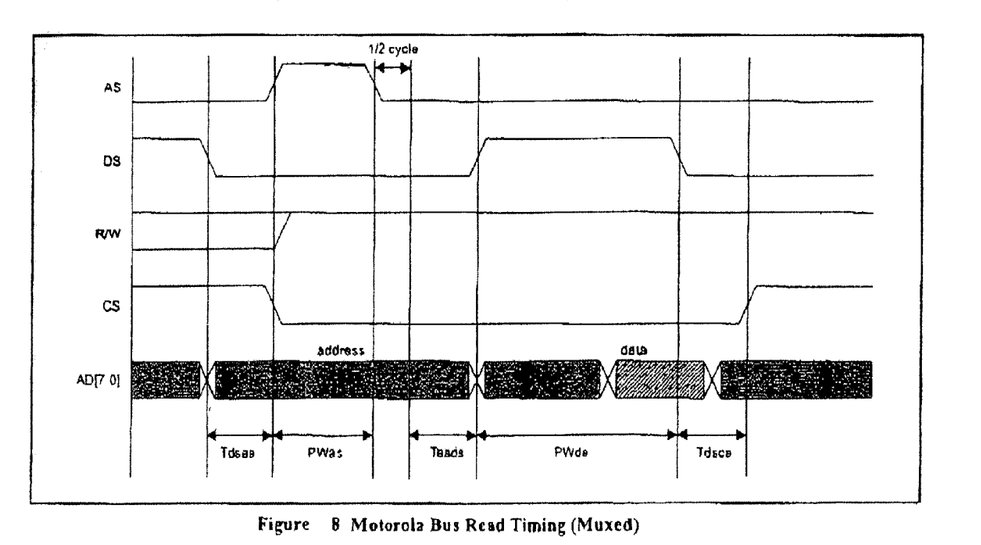
FIG. 8 illustrates a timing diagram for reading from a peripheral device communicating using a muxed Motorola® peripheral bus format.
Figure 9:
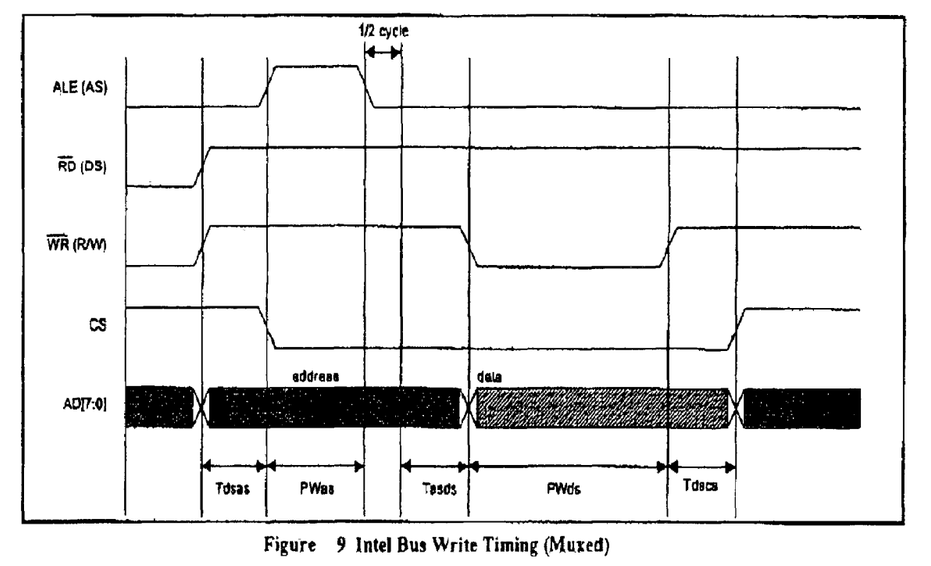
FIG. 9 illustrates a timing diagram for writing to a peripheral device communicating using a muxed Intel® peripheral bus format.
Figure 10:
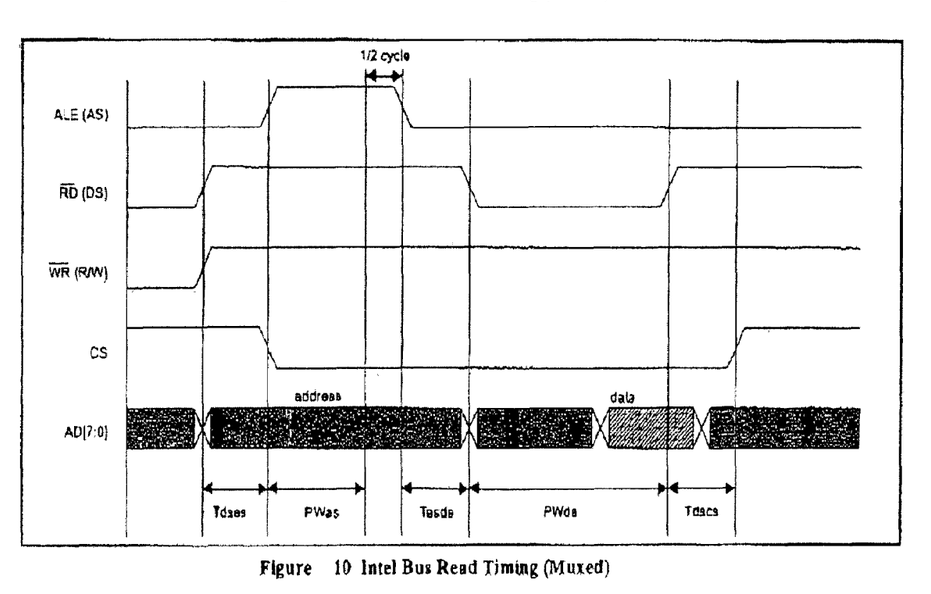
FIG. 10 illustrates a timing diagram for reading from a peripheral device communicating using a muxed Intel® peripheral bus format.

Timing data parameters 560 contain information on the number of cycles for the duration of either a signal assertion or a time between two signal transitions. For example, refer to FIG. 7 wherein a timing diagram for a Motorola® Bus Write operation, in accordance with one embodiment is shown. At the first time 710, the address is driven on the address/data bus, AD[7:0], and the data strobe, DS, signal is driven low. The $T_{dsas}$ parameter is checked and, depending on the value of $T_{dsas}$, the state machine asserts the address strobe 720, AS, if the value of $T_{dsas}$ is 0 616. Alternatively, if the value of $T_{dsas}$ is non-zero, the state machine waits for the number of cycles, as indicated by the value of $T_{dsas}$, 612 614 before asserting the address strobe 720. After the assertion of the address strobe, the $PW_{as}$ parameter is utilized to determine the width of the address strobe. The address strobe signal will be asserted for the period indicated by the $PW_{as}$ value and then deasserted 730. Upon deassertion of the address strobe signal, the state machine is in the MUX_AS_INACT state 618. In a similar manner, a delay exists between the deassertion of the address strobe and the assertion of the data strobe 740 as indicated by the $T_{asds}$ parameter. If the delay is a non-zero value, the appropriate state for waiting, MUX_AS_DLY 620 or MUX_DS 622, is entered as indicated by the value of the $T_{asds}$ parameter. The data strobe signal, DS, is deasserted after a period 750 as indicated by the $PW_{ds}$ parameter. Again, in a similar manner, depending on the value of the $T_{dscs}$ parameter, the chip select signal is deasserted as indicated by the $T_{dscs}$ value 760. Thus, in this embodiment, by using parameterized values for timing durations, flexible Motorola® bus timing can be accomplished. FIG. 8 shows similar timing information for a Motorola® bus read operation. FIGS. 9 and 10 show the timing for muxed operation for a Intel® bus read and write operations.

Block Copy Engine

One method of communication between the external local bus 245 and other functional blocks in subsystems 102a–102d of the SOC design 100 is to have a functional block communicate directly 108d with peripheral devices via the external bus interface unit 240. In this case, communication between the functional blocks and the external bus interface unit 240 occurs at a particular level of granularity. This level of granularity is typically low, at the word level. Such a low level of granularity can create undesired communication overhead. Such undesired communication overhead can be taxing on the resources used to transfer this data.

Refer again to FIG. 1 wherein a number of subsystems 102a–102d in an SOC design are shown. Each subsystem 102a–102d contains one or more functional blocks of the SOC design. Assume that the external bus interface unit 240 communicates at a word level. In such a case, each of the buses involved in the transfer of data from the external bus interface unit 240 to the target functional block, will involve the transfer of a large number of packages of information each with a small payload of data. For example, a functional block in subsystem 108b is the target of a transfer from external bus interface unit 240. Since external bus interface unit 240 transfers data in word increments, every bus transaction between a functional block in subsystem 102b will incur the overhead of transmission of a word of data at a time such as header and checksum information. Thus, with large data transfers, subsystem bus 225, SOC bus 104 and the subsystem bus internal to subsystem 108b will be burdened with the overhead of the word by word transfer.

A block copy engine 230 can work in conjunction with the external bus interface unit 240 to transfer information to the functional blocks at a higher level of granularity. The block copy engine 230 allows for the transfer of data from the external local bus 245 to a target functional block while minimizing the overhead of the transfer, as explained below. As shown in FIG. 2, the block copy engine 230 provides a parallel path for the transfer of data from the external bus interface unit 240 to the functional blocks. Thus, data may be transferred by the external bus interface unit 240 to the target functional block directly or, alternatively, the data may be transferred to the block copy engine 230 by the external bus interface unit 240.

The block copy engine 230 receives data from the external bus interface unit 240 via communication interface 235. This communications interface 235 involves the transfer of data at a low level of granularity. The block copy engine 230 receives data from the external bus interface unit 240 and stores the data. Upon receipt of a predetermined number of words, the data is then transferred to the target functional block by the block copy engine 230. This transfer can be performed at a different, perhaps higher, granularity level than that of the transfer directly from the external bus interface unit 240 to the functional block. In one embodiment, the higher level of granularity is 64 byte packets. Thus, each transfer unit transferred via the block copy unit 230 contains a 64 byte payload versus a word (2 byte) packet when transferred via the parallel but lower granularity external bus interface unit 240. Consequently, for a given amount of data to be transferred, a higher granularity transfer level allows for a transfer from the block copy engine 230 to a functional block of an amount of data equivalent to a transfer from the external bus interface unit 240 to a functional block while consuming less bandwidth.

Figure 11:
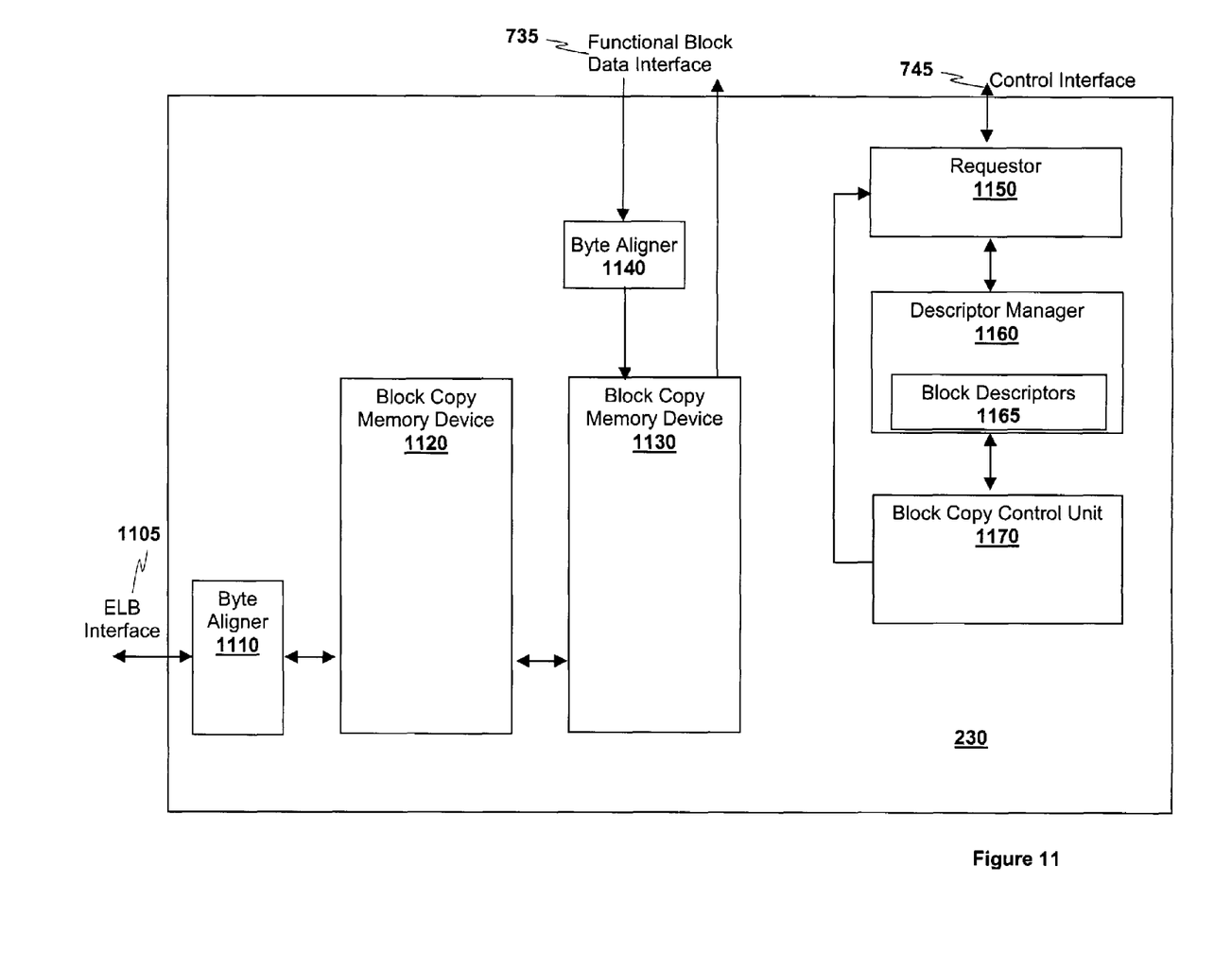
FIG. 11 illustrates a block diagram of an architecture of the block copy engine, in accordance with one embodiment.

FIG. 11 illustrates an block diagram of an architecture of the block copy engine 230, in accordance with one embodiment. Block copy engine 230 contains two block copy memory devices 1120 1130. Block copy memory device 1120 contains data as it is being transferred to/from the external bus interface unit 240. For example, as data is received at the interface 1105 to the external bus (ELB) interface unit at the first data size granularity, the data is passed to a byte aligner 1110. The byte aligner will align the data as it is filled into memory device based on the destination address of the data. When memory device 1120 fills, the data is transferred to the second block copy memory device 1130. After the transfer to the second block copy memory device 1130 is complete, the first block copy memory device 1120 accepts more data through the ELB interface. The data in the second block copy memory device 1130 is transferred out through the functional block data interface 1135 at the second data size granularity.

Transfers in the opposite direction occur in a similar manner. The data from the functional block is received by the block copy engine 230 in the second block copy memory device 1130. In one embodiment, when the second block copy memory device 1130 fills, the data contained therein is transferred to the first block copy memory device 1120 to be further transferred to the external bus interface unit 240. In another embodiment, the data being received by the second block copy memory device 1130 is transferred to the first block copy memory device 1120 as it is received. The data transferred to the external bus interface unit 240 is transferred at a slower rate than it is received from the functional block. Thus the first block copy memory device 1120 will fill, then the second block copy memory device 1130 will begin filling and transferring data to the first block copy memory device 1120 as that device empties.

If the external bus interface unit 240 is in the middle of a transfer to/from the block copy engine and receives a request for a transfer from another device such as the subsystem processor 220 or data transfer unit 108d, the external bus interface unit 240 will suspend the transfer to the block copy engine 230 and service the request of the other device.

In addition to the ability to facilitate transfers between the external bus interface unit 240 and the functional blocks, the block copy engine 230 supports general purpose transfers in the system. In addition, the block copy engine supports the ability to transfer to/from any device in any of the subsystems 102a–102d to any other device in the system, including other subsystems 102a–102d. Moreover, the block copy engine 230 supports the ability to perform any byte to any byte transfers. Thus, the source and destination locations do not need to be aligned at any particular boundary (e.g. 16 byte boundaries). This is particularly useful in eliminating system processor data copies when aligning data to particular boundaries. The block copy engine 230 also has the ability to performed transfers wherein the data being transferred is to be byte aligned. This function is performed by byte aligner 1140.

The block copy device 230 contains a control unit 1170 for managing transfers performed by the block copy engine 230. Block copy descriptor registers 1165 are managed by a descriptor manager and contain information used by the control unit 1170 in facilitating transfer of data by the block copy engine 230. These block copy descriptor registers 1165 are used by the block copy control unit 1170 when transferring data to the external local bus interface, as well as when performing a data transfer between internal locations.

Figure 12:
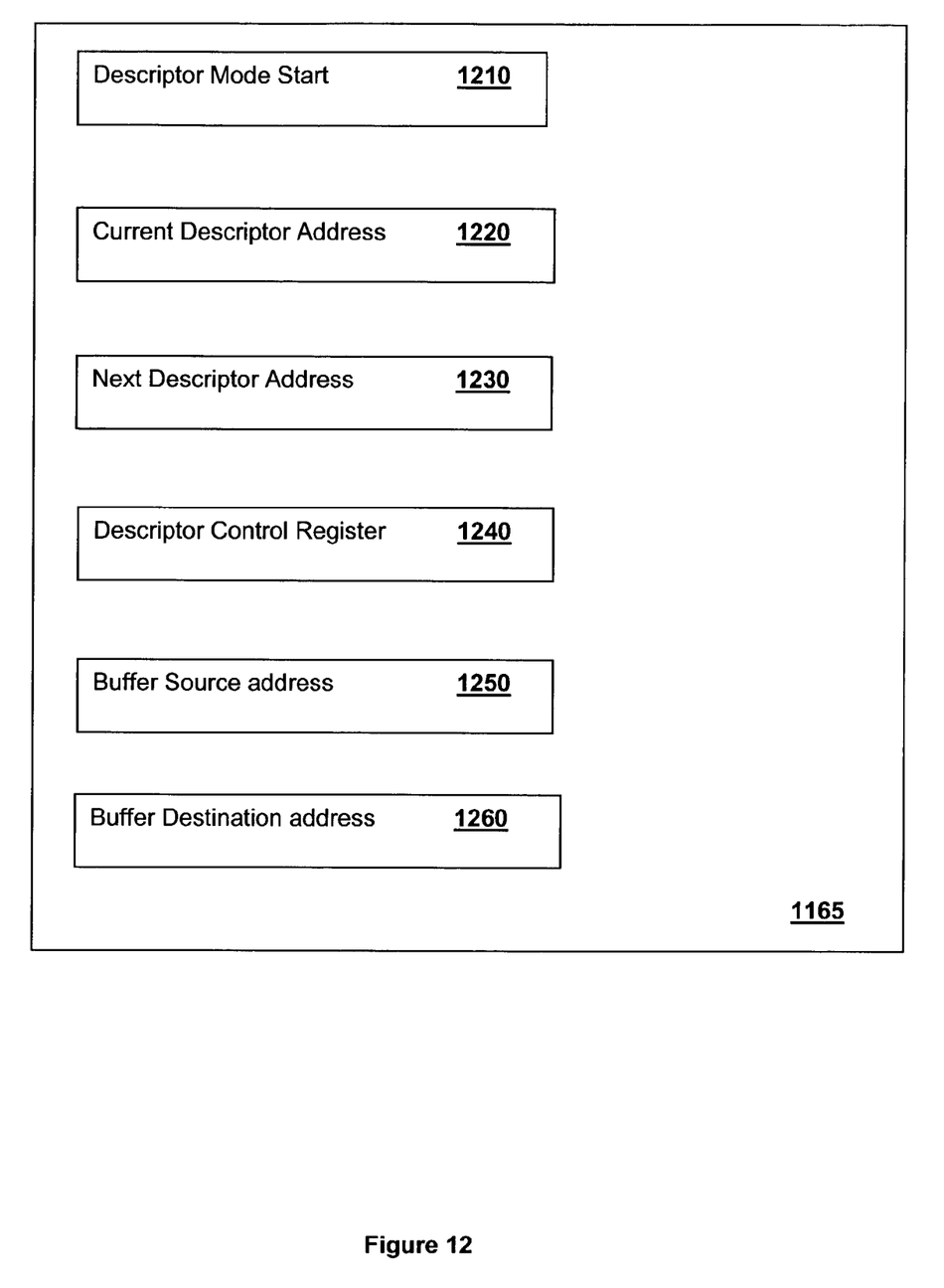
FIG. 12 illustrates block copy descriptor registers, in accordance with one embodiment.

FIG. 12 illustrates block copy descriptor registers, in accordance with one embodiment. In this embodiment, the buffer source address register 1250 contains the starting location for the transfer of data by the block copy engine 230. Buffer destination address register 1260 contains the target for the transferred data. In this embodiment, data is transferred between locations in packets. Further, each packet of data is a 64 byte packet. If a data transfer request is to transfer more than 64 bytes of data, as indicated by a byte transfer count in the descriptor control register 1240, the request will be divided into multiple requests. The block copy control unit will generate the appropriate 64 byte transfer requests and send them to the requestor 1150. Upon receipt of each 64 byte transfer request, the requestor 1150 sends the request to the appropriate source functional block requesting the transfer.

Conclusion and Epilogue

Thus, it can be seen from the above descriptions, an improved, flexible method for transferring data between external devices to an SOC design and functional blocks within the SOC design is disclosed. The novel scheme includes features to facilitate communication with on-chip and off-chip peripheral devices. While the present invention has been described in terms of the foregoing embodiments, those skilled in the art will recognize that the invention is not limited to these embodiments. The present invention may be practiced with modification and alteration within the spirit and scope of the appended claims. In particular, while for ease of understanding, the description included illustrations for only two different external bus protocols, the present invention may be practiced with two or more different external bus protocols. Such more expanded practice is well within the ability of those ordinarily skilled in the art, in view of the description presented above. Thus, the description is to be regarded as illustrative instead of restrictive on the present invention.

What is claimed is:

1. An integrated circuit comprising:
    a plurality of functional blocks;
    a bus coupled to the plurality of functional blocks;
    a data transfer unit coupled to the bus;
    a first input/output interface block coupled to the data transfer unit and a plurality of devices, the first input/output interface block to facilitate transfer of data from the plurality of devices to selected ones of the plurality of functional blocks, the transfer occurring at a first data size granularity; and
    a second input/output interface block coupled to the data transfer unit and the plurality of devices to facilitate transfer of data from the plurality of devices to selected ones of the plurality of functional blocks, the transfer occurring at a second data size granularity.

2. The integrated circuit of claim 1 wherein the second input/output interface block further to facilitate the transfer of data from a first selected one of the plurality of functional blocks to a second selected one of the plurality of functional blocks.

3. The integrated circuit of claim 1 wherein the second input/output interface block to facilitate transfers to a selected one of the plurality of functional blocks such that locations of the selected one of the plurality of functional blocks fill with a predetermined pattern.

4. The integrated circuit of claim 1 wherein the second input/output interface block comprises a byte aligner to align transferred data based at least on a source and a destination address.

5. The integrated circuit of claim 1 wherein the second input/output interface block is coupled to the plurality of devices through the first input/output interface block.

6. The integrated circuit of claim 1 wherein the second input/output interface block comprises two memory units.

7. The integrated circuit of claim 6 wherein a first memory unit is coupled to the plurality of devices and the second memory unit is coupled to the selected ones of the plurality of functional blocks.

8. The integrated circuit of claim 1 wherein second data size granularity is larger that the first data size granularity.

9. The integrated circuit of claim 1 wherein the second input/output interface block is configurable to perform any byte to any byte transfers between the plurality of devices and a selected one of the plurality of functional blocks.

10. The integrated circuit of claim 1 wherein the second input/output interface block to facilitate a protocol conversion for the transferred data.

11. In an integrated circuit comprising a plurality of functional blocks and a plurality of input/output interface blocks coupled to a plurality of devices, a method comprising:
    transferring data from a selected one of the plurality of devices to a first of the input/output interface blocks at a first data size granularity;
    transferring the data from the first of the input/output interface blocks to a second of the input/output interface blocks; and transferring the data from the second of the input/output interface blocks to a first selected one of the plurality of functional blocks at a second data size granularity.

12. The method of claim 11 wherein the method further comprises a second selected one of the plurality of functional blocks transferring data to the second input/output interface block, and the second input/output interface block further transfers the data a third selected one of the plurality of functional blocks.

13. The method of claim 12, wherein either the first and the second selected one of the plurality of function blocks is one of the same function block, or the first and the third selected one of the plurality of function blocks is one of the same function block.

14. The method of claim 11 wherein the second input/output interface block facilitates transfers to a selected one of the plurality of functional blocks such that locations of the selected one of the plurality of functional blocks fill with a predetermined pattern.

15. The method of claim 11 wherein the second input/output interface block transfers data in an aligned manner based at least on a source and a destination address.

16. The method of claim 11 wherein the second data size granularity is larger that the first data size granularity.

17. The method of claim 11 wherein the data were initially stored in the selected one of the plurality of devices, starting at a first byte position, and store in the selected one of the plurality of functional blocks, starting at a second byte position.

18. The method of claim 11 wherein a selected one of the first and the second input/output interface block further facilitates a protocol conversion for the transferred data.

19. In an integrated circuit comprising a plurality of functional blocks and a plurality of input/output interface blocks coupled to a plurality of devices, a method comprising:

transferring data from a selected one of the plurality of functional blocks to a first of the input/output interface blocks at a first data size granularity;

transferring the data from the first of the input/output interface blocks to a second of the input/output interface blocks; and transferring the data from the second of the input/output interface blocks to a first selected one of the plurality of devices at a second data size granularity.

20. The method of claim 19, wherein the method further comprises a second selected one of the plurality of functional blocks transferring data to the first input/output interface block, and the second input/output interface block further transfers the data to a third selected one of the plurality of functional blocks.

21. The method of claim 20, wherein either the first and the second selected one of the plurality of function blocks is one of the same function block, or the first and the third selected one of the plurality of function blocks is one of the same function block.

* * * * *